United States Patent
Park et al.

(10) Patent No.: US 11,454,436 B2
(45) Date of Patent: Sep. 27, 2022

(54) REFRIGERATOR HAVING VARIABLE SPEED COMPRESSOR AND CONTROL METHOD THEREOF

(71) Applicant: Samsung Electronics Co., Ltd., Suwon-si (KR)

(72) Inventors: Sung In Park, Yongin-si (KR); Hyo Jin Yoon, Suwon-si (KR); Pyeong Ki Park, Suwon-si (KR); Hyo Jae Shin, Suwon-si (KR); Jae Won Yang, Suwon-si (KR); Ho-Hyun Ryu, Suwon-si (KR); Hyung Gwan Je, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/643,413

(22) PCT Filed: Aug. 24, 2018

(86) PCT No.: PCT/KR2018/009791
§ 371 (c)(1),
(2) Date: Feb. 28, 2020

(87) PCT Pub. No.: WO2019/045371
PCT Pub. Date: Mar. 7, 2019

(65) Prior Publication Data
US 2020/0400355 A1 Dec. 24, 2020

(30) Foreign Application Priority Data
Aug. 28, 2017 (KR) .................. 10-2017-0108545

(51) Int. Cl.
*F25D 29/00* (2006.01)
*F25B 49/02* (2006.01)

(52) U.S. Cl.
CPC ............ *F25B 49/022* (2013.01); *F25D 29/00* (2013.01); *F25B 49/025* (2013.01);
(Continued)

(58) Field of Classification Search
CPC .... F25D 29/00; F25D 2700/151; F25B 49/02; F25B 49/022; F25B 49/025;
(Continued)

(56) References Cited

U.S. PATENT DOCUMENTS 6,813,897 B1* 11/2004 Bash .................. G06F 1/206
62/175
2002/0189433 A1* 12/2002 Unger .................. F02B 71/00
91/361
(Continued)

FOREIGN PATENT DOCUMENTS

CN 104764286 A 7/2015
CN 106152698 A 11/2016
(Continued)

OTHER PUBLICATIONS

WO 2007-096436 (English translation) (Year: 2007).*
(Continued)

*Primary Examiner* — Jonathan Bradford (57) ABSTRACT

A refrigerator and a method for controlling the same are disclosed. The refrigerator may minimize the size and material cost of the control system by controlling the internal temperature and the speed of a compressor using a thermostat used in the conventional low-capacity/low-cost refrigerator without using a system controller equipped with various sensors (internal sensors and/or external sensors) capable of controlling the internal temperature. In addition, since an inverter controller capable of controlling a BLDC compressor estimates the internal/external temperature based on operation information of the compressor, and
(Continued)

determines the internal load, it may save energy and reduce vibrations and noise, which are the largest disadvantages of a constant-speed compressor, thereby improving satisfaction of the consumer. In addition, the BLDC compressor may be started and operated stably by applying a differentiated algorithm of the inverter controller.

18 Claims, 9 Drawing Sheets

(52) U.S. Cl.
CPC . *F25B 2600/021* (2013.01); *F25B 2600/0253* (2013.01); *F25B 2700/151* (2013.01); *F25D 2700/12* (2013.01)

(58) Field of Classification Search
CPC ........ F25B 2600/021; F25B 2600/0253; F25B 2700/12; F25B 2700/151
See application file for complete search history.

(56) References Cited

U.S. PATENT DOCUMENTS

| | | | |
|---|---|---|---|
| 2003/0108430 A1 | 6/2003 | Yoshida et al. | |
| 2009/0056385 A1* | 3/2009 | Maekawa | D06F 34/10 |
| | | | 68/12.16 |
| 2012/0090337 A1* | 4/2012 | Chen | F25B 30/02 |
| | | | 62/79 |
| 2014/0174118 A1* | 6/2014 | Shinomoto | H02M 7/53871 |
| | | | 62/324.1 |
| 2016/0334152 A1 | 11/2016 | Hwang et al. | |
| 2017/0067683 A1 | 3/2017 | Hu | |
| 2017/0219277 A1 | 8/2017 | Ryu et al. | |

FOREIGN PATENT DOCUMENTS

| | | | | |
|---|---|---|---|---|
| JP | H11-281172 | A | 10/1999 | |
| JP | 2002-039602 | A | 2/2002 | |
| JP | 2003-176788 | A | 6/2003 | |
| JP | 2005-057989 | A | 3/2005 | |
| JP | 2014158324 | A | 8/2014 | |
| KR | 20010019695 | A | 3/2001 | |
| KR | 10-0792052 | B1 | 1/2008 | |
| KR | 10-0846115 | B1 | 7/2008 | |
| KR | 10-0850672 | B1 | 8/2008 | |
| KR | 10-2017-0029347 | A | 3/2017 | |
| KR | 10-2017-0072111 | A | 6/2017 | |
| KR | 10-2017-0090777 | A | 8/2017 | |
| KR | 10-2017-0094551 | A | 8/2017 | |
| WO | WO-2017037945 | A1 * | 3/2017 | ............. F25B 31/02 |
| WO | 2017/104929 | A1 | 6/2017 | |

OTHER PUBLICATIONS

ISA/KR, International Search Report and Written Opinion of the International Searching Authority, International Application No. PCT/KR2018/009791, dated Dec. 21, 2018, 29 pages.
The First Office Action dated Apr. 25, 2021, in connection with Chinese Patent Application No. 201880056313.5, 21 pages.
China National Intellectual Property Administration, "Notification of the Second Office Action" dated Sep. 27, 2021, in connection with Chinese Patent Application No. 201880056313.5, 21 pages.
Korean Intellectual Property Office, "Notice of Preliminary Rejection" dated Oct. 20, 2021, in connection with Korean Patent Application No. 10-2017-0108545, 20 pages.
China National Intellectual Property Administration, "Rejection Decision" dated Jan. 29, 2022, in connection with Chinese Patent Application No. 201880056313.5, 19 pages.
Decision of Rejection dated Apr. 25, 2022, in connection with Korean Application No. 10-2017-0108545, 8 pages.
Notice of Patent Allowance dated Aug. 11, 2022 in connection with Korean Patent Application No. 10-2017-0108545, 6 pages.

* cited by examiner

REFRIGERATOR HAVING VARIABLE SPEED COMPRESSOR AND CONTROL METHOD THEREOF

CROSS-REFERENCE TO RELATED APPLICATIONS

This application is a 371 National Stage of International Application No. PCT/KR2018/009791, filed Aug. 24, 2018, which claims priority to Korean Patent Application No. 10-2017-0108545, filed Aug. 28, 2017, the disclosures of which are herein incorporated by reference in their entirety.

BACKGROUND

1. Field

The present disclosure relates to a refrigerator and a method of controlling the refrigerator.

SUMMARY

It is an aspect of the present disclosure to provide a refrigerator and method for controlling the same, capable of controlling an internal temperature and speed of a compressor by using operation information of the compressor without a sensor capable of controlling the internal temperature.

A refrigerator and a method for controlling the same according to embodiments of the present disclosure may minimize the size and material cost of a control system by controlling the internal temperature and the speed of a compressor using a thermostat used in the conventional low-capacity/low-cost refrigerator without using a system controller equipped with various sensors (internal sensors and/or external sensors) capable of controlling the internal temperature. Furthermore, since the inverter controller capable of controlling the BLDC compressor estimates the internal/external temperature using operation information of the compressor and determines an internal load, it may save energy and reduce vibrations and noise, which are the largest disadvantages of a constant-speed compressor, thereby improving satisfaction of the consumer. In addition, the BLDC compressor may be started and operated stably by applying a differentiated algorithm for the inverter controller.

DETAILED DESCRIPTION

Reference will now be made in detail to the embodiments of the present disclosure, examples of which are illustrated in the accompanying drawings, wherein like reference numerals refer to like elements throughout.

In addition, the same reference numerals or signs given in each drawing of the present disclosure represent parts or components that perform substantially the same function.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

The embodiments of the present disclosure will now be described with reference to the accompanying drawings.

The idea of the present disclosure is basically applied to low-capacity/low-cost refrigerators. The refrigerators may be broadly classified into a side-by-side type refrigerator, a bottom freezer type refrigerator, and a top mount type refrigerator. In the side-by-side type refrigerator, the freezing chamber and the refrigerating chamber are arranged side by side. In the bottom freezer type refrigerator, the freezing chamber is arranged under the refrigerating chamber. In the top mount type refrigerator, the freezing chamber is arranged above the refrigerating chamber. Although the refrigerator according to embodiments is exemplarily implemented as the side-by-side type refrigerator for convenience of description and better understanding of the present disclosure, the scope or spirit of the present disclosure is not limited thereto, and the embodiments may also be applied to the bottom freezer type refrigerator, the top mount type refrigerator, and a combination thereof.

In addition, the idea of the present disclosure may be applied to the refrigerator of the type provided in the freezer compartment as well as the refrigerator provided in the refrigerator compartment.

Figure 1:
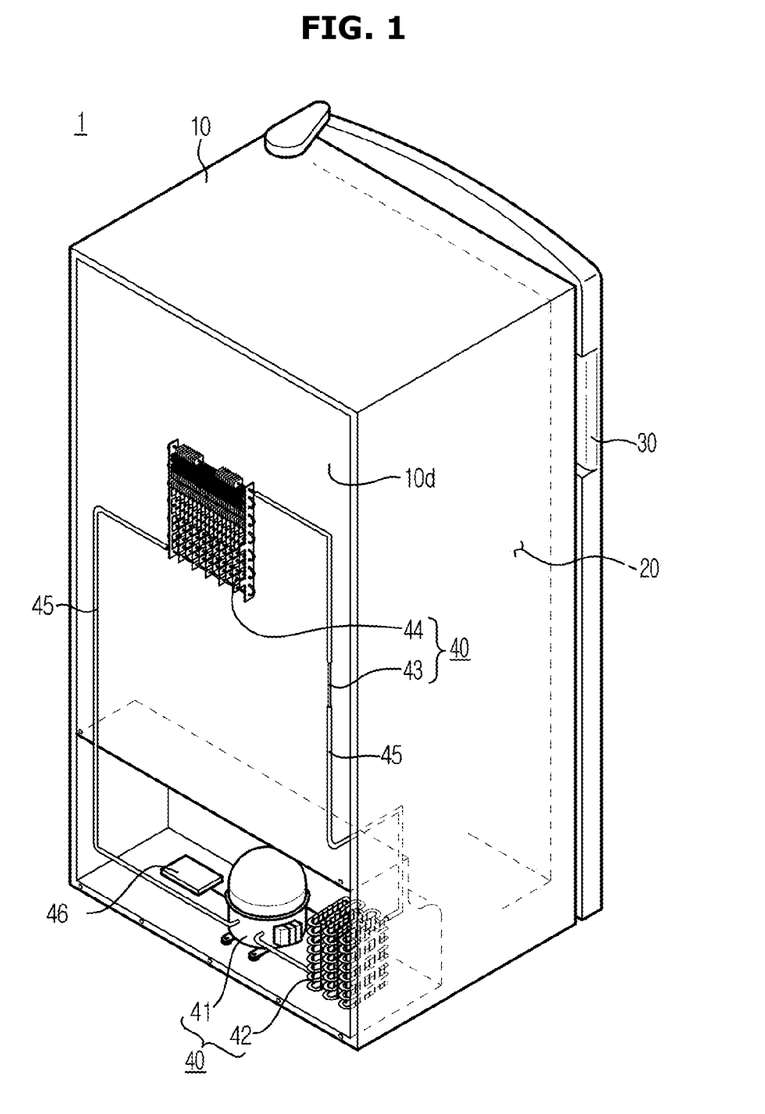
FIG. 1 is a perspective view schematically illustrating a structure of a refrigerator according to an embodiment.

FIG. 1 is a perspective view schematically illustrating a structure of a refrigerator according to an embodiment.

Referring to FIG. 1, a refrigerator 1 according to an embodiment may include a box-shaped housing 10 forming an external appearance thereof, a storage chamber 20 formed in the housing 10 while being divided into upper and lower storage chambers, a door 30 configured to open or close the storage chamber 20, and a cooling device 40 configured to provide the storage chamber 20 with cool air.

The cooling device 40 may include a compressor 41 to compress gaseous refrigerant, a condenser 42 to convert the compressed gaseous refrigerant into liquid refrigerant, an expander 43 to decompress the liquid refrigerant, and an evaporator 44 to convert the decompressed liquid refrigerant into gaseous refrigerant.

The compressor 41 may be provided at a lower end of the rear surface 10d of the refrigerator 1. The compressor 41 may compress suctioned low-temperature and low-pressure refrigerant to form high-temperature and high-pressure refrigerant, and then discharge the high-temperature and high-pressure refrigerant.

For this purpose, the compressor 41 may mandatorily suction the refrigerant, and compress the suctioned refrigerant to produce high-temperature and high-pressure gas. Suctioning of the refrigerant may be carried out using rotational force of an embedded motor 411. According to the embodiment, the compressor 41 may be a brushless direct current (BLDC) compressor using an inverter controller. The motor 411 of the BLDC compressor 41 may be rotatable at various rotational speeds, thereby controlling the flow rate of the refrigerant. The rotational speed of the motor 411 of the compressor 41 may be expressed in the unit of revolution per minute (RPM). Therefore, an amount or speed of the refrigerant circulation may be determined according to a degree to which the compressor 41 operates, for example, the rotational speed of the motor 411, and the cooling efficiency of the refrigerator 1 may also be determined.

In addition, the compressor 41 may include an inlet through which the refrigerant is introduced, a flow space in which the introduced refrigerant flows, a motor rotating in the flow space and parts associated with the motor, and an outlet through which compressed refrigerant is discharged.

The refrigerant transferred to the compressor 41 may include ChloroFluoroCarbon (CFC), HydroChloroFluoroCarbon (HCFC), HydroFluoroCarbon (HFC), or the like. However, the refrigerant is not limited thereto, and various kinds of materials that may be selected by a designer may be used as the refrigerant.

The compressor 41 applied in the present disclosure may include an inverter compressor, a positive displacement compressor, a dynamic compressor, or the like.

The high-temperature and high-pressure gaseous refrigerant compressed by the compressor 41 may be transferred to the condenser 42.

The condenser 42 may be provided on the rear surface 10d of the refrigerator 1. If necessary, the condenser 40 may be provided at the lower end of the rear surface 10d of the refrigerator 1 and may be exposed to the outside from the middle of the rear surface 10d of the refrigerator 1 to facilitate heat radiation.

The condenser 42 may be connected to a discharge tube on a high-pressure side of the compressor 41 for allowing the high-temperature and high-pressure gaseous refrigerant compressed by the compressor 41 to exchange heat with ambient air, thereby condensing the high-temperature and high-pressure gaseous refrigerant into liquid refrigerant. In the condenser 42, the refrigerant emits heat to the outside while being liquefied, and accordingly, the temperature of the refrigerant is lowered.

According to the embodiment, the condenser 42 may be implemented using a pipe formed to be bent into a zigzag shape. In this case, one end of the pipe may extend from a refrigerant pipe 45 connected to the compressor 41, and the other end of the pipe may extend from the refrigerant pipe 45 connected to the expander 43.

The expander 43 may be installed inside or outside the housing 10 of the refrigerator 1 for expanding and decompressing the high temperature and high pressure liquid refrigerant condensed by the condenser 42 to a two-phase refrigerant, which is a mixture of liquid and gaseous components at low temperature and low pressure, using a capillary tube. The capillary tube may be embodied by a thin tube, and the refrigerant that has passed through the capillary tube may be decompressed and delivered to the evaporator 44.

According to the embodiment, the capillary tube may be replaced by an expansion valve. The expansion valve may include various types of valves such as a thermoelectronic expansion valve using bimetallic deformation, a thermal expansion type electronic expansion valve using volume expansion by heating of a sealing wax, a pulse width modulation type electronic expansion valve for opening or closing a solenoid valve by a pulse signal, or an electronic expansion valve of a stem motor type for opening or closing the valve using a motor.

The evaporator 44 may be provided inside of the rear surface 10d of the refrigerator 1. In this case, the evaporator 44 may be installed in the vicinity of the storage chamber 20.

The evaporator 44 may provide cold air by evaporating a low-temperature and low-pressure liquid refrigerant expanded by the expander 43 into a gaseous state.

As described above, the cooling device 40 may supply the cold air using a phenomenon of the decompressed liquid refrigerant absorbing heat energy from the ambient air while being converted to a gaseous refrigerant.

The compressor 41, the condenser 42, the expander 43 and the evaporator 44 are interconnected through the refrigerant pipe 45 to implement a refrigerant cycle.

The refrigerant pipe 45 may be provided to connect two of the compressor 41, the condenser 42, the expander 43 and the evaporator 44, and disposed at any position within the housing 10 of the refrigerator 1 according to the designer's selection.

Meanwhile, the structure of the cooling device 40 is not limited to the compressor 41, the condenser 42, the expander 43, and the evaporator 44.

For example, the cooling device 40 may include a peltier element that uses a Peltier effect. The Peltier effect refers to a phenomenon when a current flow on a contact face between two different kinds of metals, one of the metals is subject to radiation of heat and the other is subject to absorption of heat. The cooling device 40 may supply cold air to the storage chamber 20 using the peltier element.

In another example, the cooling device 40 may include a magnetic cooling device that uses a magnetocaloric effect. The magnetocaloric effect may refer to an effect where a particular material (e.g., magnetocaloric material) emits heat when magnetized and absorb heat when demagnetized. The cooling device 40 may supply cold air to the storage chamber 20 using the magnetic cooling device.

In addition, a substrate assembly 46 having a processor for controlling the refrigerator 1 may be provided inside the refrigerator 1. The substrate assembly 46 may include at least one semiconductor chip and associated components, and a substrate upon which these components may be mounted. The semiconductor chip and associated components provided in the substrate assembly 46 may include a processor functioning as an inverter controller 100, which will be described later, a semiconductor chip or a magnetic disk functioning as a storage. The substrate assembly 46 may be electrically connected to various semiconductor chips and associated components, a power supply 50 for supplying power to the compressor 41 or the like.

Figure 2:
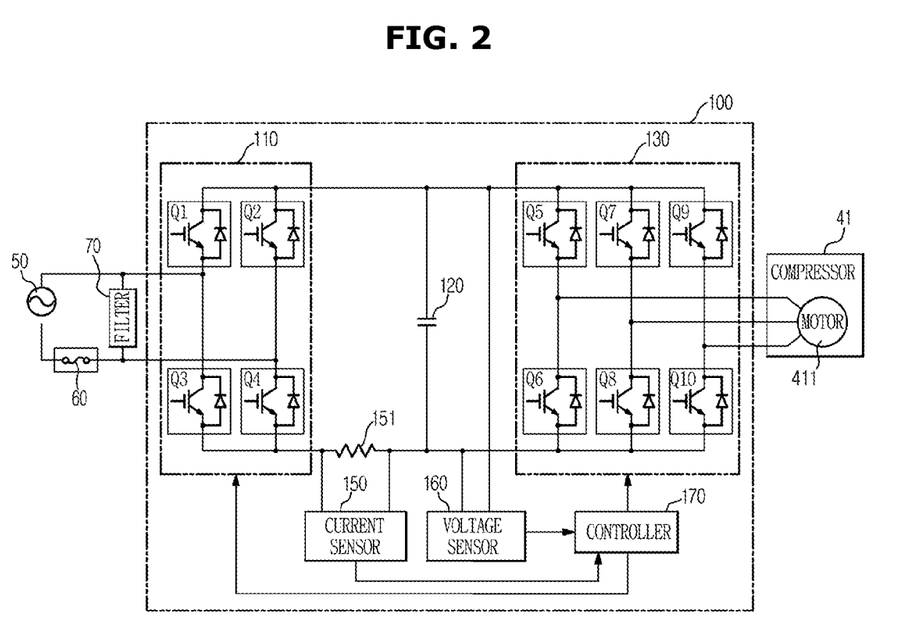
FIG. 2 is a block diagram illustrating a refrigerator according to an embodiment.

FIG. 2 is a block diagram illustrating a refrigerator according to an embodiment.

Referring to FIG. 2, the refrigerator 1 according to an embodiment of the present disclosure may further include the power supply 50, a thermostat 60, a filter 70, and the inverter controller 100 in addition to the cooling device 40.

The power supply 50 may supply power to various components in the refrigerator 1. The power supply 50 may be configured to receive an external commercial power and convert the received commercial power supply into an appropriate voltage and/or current to be supplied to each component. Also, the power supply 50 may be implemented using a battery capable of storing electric energy, in which case the battery may be rechargeable. According to the embodiment, the power supply 50 may supply the electric energy of a predetermined voltage and/or current to the compressor 41 through a circuit or a separate lead provided on the substrate assembly 46. In this case, the power supply 50 may supply the electric energy of the predetermined voltage and/or current to the compressor 41 through the inverter controller 100.

The thermostat 60 may open or close a switch according to an operation of a bimetal implemented by two alloy plates having different expansion coefficients. The thermostat 60 may electrically link the power supply 50 and the inverter controller 100 according to the internal temperature of the inside of the storage chamber 20.

Particularly, the thermostat 60 may allow power to be applied to the inverter controller 100 by electrically connecting the power supply 50 and the inverter controller 100 as the bimetal bends and puts the circuit in a conducting state when the internal temperature of the storage chamber 20 increases.

As described above, the thermostat 60 may be in the conducting state as the internal temperature of the storage chamber 20 increases, and the power supplied from the power supply 50, that is, an electrical signal, may be applied to the inverter controller 100 through the thermostat 60.

Therefore, when the circuit is put in the conducting state by the thermostat 60, the inverter controller 100 may drive the motor 411 of the compressor 41 to be rotated.

The filter 70 may be connected between the power supply 50 and the inverter controller 100, and may block switching noise generated when the compressor 41 is controlled.

The inverter controller 100 may include a converter 110, a smoothing capacitor 120, an inverter 130, a current sensor 150, a voltage sensor 160, and a controller 170.

The converter 110 may be connected between the power supply 50 and the inverter 130, and may rectify alternating current (AC) power supplied from the power supply 50 to output DC link voltage.

For example, the converter 110 may be comprised of a half-wave rectification circuit of diodes, and may convert the AC power supplied from the power supply 50 to DC power by half-wave rectification.

In addition, the converter 110 may perform full-wave rectification of the AC power source by connecting four switching elements Q1 to Q4 in the form of a high bridge as illustrated in FIG. 2 instead of the conventional diodes.

The smoothing capacitor 120 may be connected between the converter 110 and the inverter 130 to smooth and convert a voltage output from the converter 20 into DC.

The inverter 130 may change a DC voltage output from the smoothing capacitor 120 into a pulsed three-phase AC (U, V, W) having an arbitrary variable frequency through pulse width modulation and drive the motor 411 of the compressor 41. The inverter 130 is an ordinary switching circuit for inverting a DC voltage into three-phase AC by connecting six switching elements Q5 to Q10 and a free-wheeling diode into a three-phase full bridge and applying the three-phase AC to the motor 411.

The six switching elements Q5 to Q10 may include high voltage switching devices such as high voltage bipolar junction transistors, high voltage field effect transistors, or insulated gate bipolar transistors (IGBTs).

For example, the inverter 130 may be a voltage source inverter of a three-phase full bridge type. Particularly, in the inverter 130, six switching elements Q5 to Q10 are interconnected. More particularly, three upper switching elements Q5, Q7 and Q9 may be connected in parallel with one another, and three lower switching elements Q6, Q8 and Q10 may be connected in parallel with one another. The three upper switching elements Q5, Q7 and Q9 and the three lower switching elements Q6, Q8 and Q10 may be connected in series one to one. The three upper switching elements Q5, Q5, Q7 and Q9 and the lower switching elements Q6, Q8 and Q10 may be connected to the motor 411.

The current sensor 150 may detect a current flowing in the winding of the internal motor 411 of the compressor 41 by using a shunt resistor 151 connected to the lower ends of the switching elements Q3 and Q4 of the converter 110. The current sensor 150 may detect the current flowing in the shunt resistor 151 with an input of a voltage across the shunt resistor 151, and may send the detection result to the controller 170.

The voltage sensor 160 may be connected to a DC link stage and may detect the voltage applied to the winding of the internal motor 411 of the compressor 41 using the DC link voltage across the DC link stage. The voltage sensor 160 may detect the DC link voltage produced by the current entering the DC link stage from the power supply 50 and send the detection result to the controller 170.

The controller 170 may control the converter 110 and the inverter 130 by outputting a pattern of a PWM signal supplied to the converter 110 and the inverter 130. The controller 170 may be implemented by a microprocessor (MCU) that controls the switching elements Q1 to Q10 of the converter 110 and the inverter 130 to be turned on or off.

The controller 170 may also include a timer that counts operation time of the compressor 41.

The controller 170 may calculate the current power consumption of the compressor 41 by using the voltage applied to the winding of the motor 411 and the current flowing in the winding of the motor 411, and may change operation speed of the compressor 41 by estimating the internal temperature of the storage chamber 20 based on the calculated current power consumption of the compressor 41.

The controller 170 may also change the operation speed of the compressor 41 by estimating the external temperature using the current operation speed and the operation time of the compressor 41.

Operations and effects of a refrigerator and method for controlling the same according to an embodiment of the present disclosure will now be described in detail.

Figure 3:
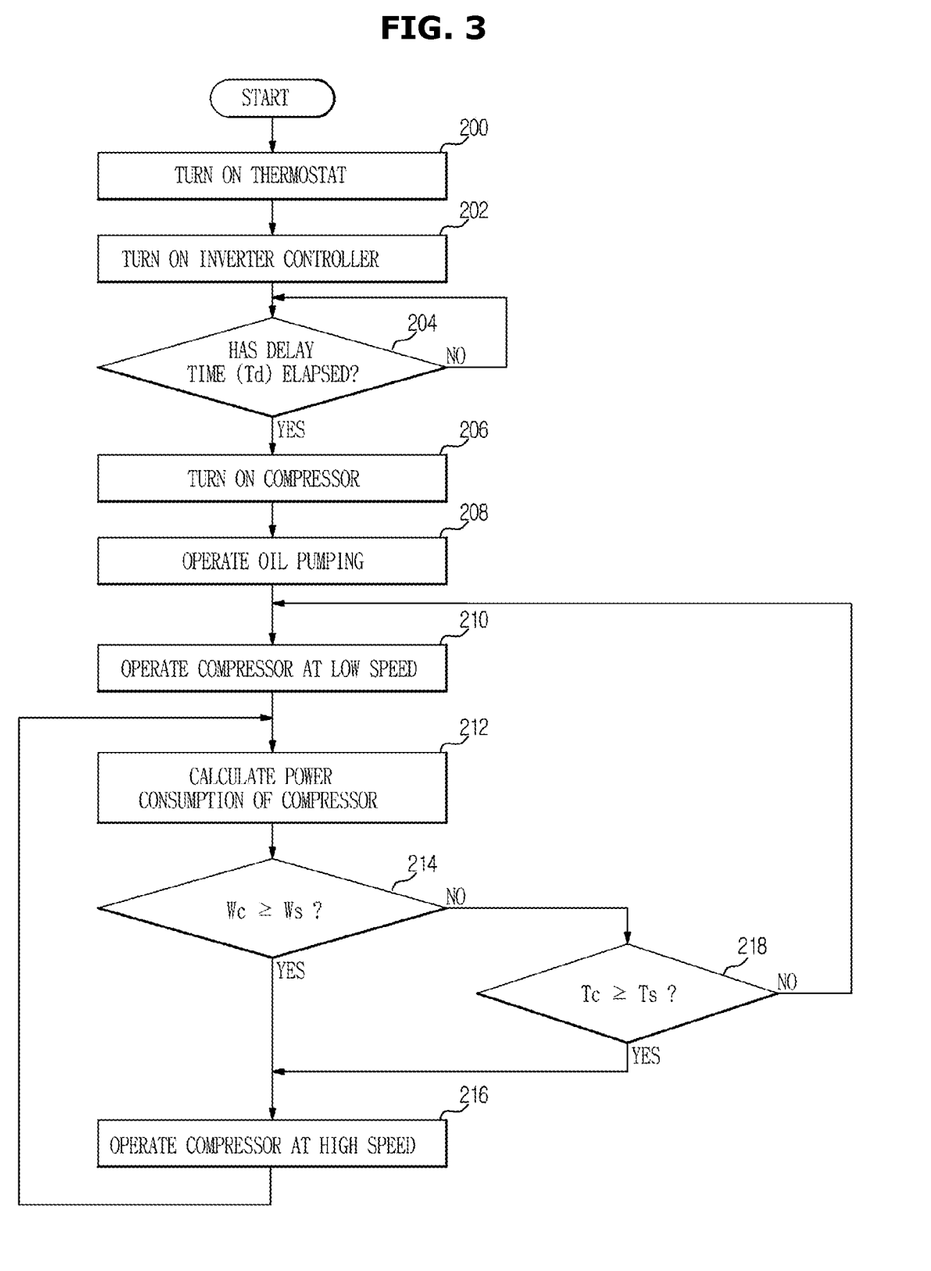
FIG. 3 is a flowchart illustrating an inverter control algorithm of a refrigerator according to an embodiment.

FIG. 3 is a flowchart illustrating an inverter control algorithm of the refrigerator according to an embodiment.

Referring to FIG. 3, when an initial internal temperature increases, the thermostat 60 operates (200), allowing the inverter controller 100 to be powered (202).

At this time, the inverter controller 100 is powered for the first time, so it has no information about the refrigerator 1, e.g., information about a state of the refrigerant cycle.

Accordingly, the controller 170 may count time after the initial power is applied to the inverter controller 100, and determine whether the counted time elapses by a set delay time Td (i.e., a time (about 2 minutes, 1 minute, or 30 seconds) for protecting the compressor from start failure) (204).

When the initial power is applied to the inverter controller 100 and the counted time elapses by the delay time Td (204), the controller 170 switches the inverter 130 to turn on the compressor 41 (206).

When the compressor 41 is started, an oil pumping operation is performed to smoothly operate the mechanical part of the compressor 41 (208). A spring type oil pumping structure is employed in the motor 411 of the BLDC compressor 41 to supply oil to the compressor 41 when the compressor 41 is operated.

After the oil pumping operation, the compressor 41 may be operated at low speed for a predetermined time (about 10 minutes) (210).

During the low speed operation of the compressor 41, the controller 170 calculates the current power consumption Wc of the compressor 41 using the voltage applied to the winding of the motor 411 and the current flowing in the winding of the motor 411 (212).

The controller 170 compares the calculated current power consumption Wc of the compressor 41 with reference power Ws (214), and estimates the internal temperature of the storage chamber 20 and control the operation speed of the compressor 41.

When the power consumption Wc is equal to or higher than the reference power Ws (214), the controller 170 determines that the storage chamber 20 is in a high load state where the internal temperature is high and operate the compressor 41 at high speed (216). The controller 170 goes back to operation (212) and performs subsequent operations starting from operation (212).

In this way, when the current power consumption Wc of the compressor 41 is equal to or higher than the reference power Ws, the controller 170 may determine that the internal temperature condition is high as compared to the cooling ability, and increase the operation speed of the compressor 41 to execute high cooling ability.

When the power consumption Wc is less than the reference power Ws (214), the controller 170 may determine that the internal temperature of the storage chamber 20 is in an appropriate load state.

Next, the controller 170 compares the operation time Tc of the compressor 41 with reference time Ts (218), and estimates the external temperature and control the operation speed of the compressor 41.

When the operation time Tc of the compressor 41 is equal to or more than the reference time Ts (218), the controller 170 determines that the external temperature is high and proceed to operation 216 to operate the compressor 41 at the high speed.

In this way, when the current power consumption Wc of the compressor 41 is less than or the reference power Ws and the operation time Tc of the compressor 41 is equal to or more than the reference time Ts, the controller 170 may determine that the internal temperature condition is appropriate for the cooling ability but the external temperature condition is high as compared to the cooling ability, and increase the operation speed of the compressor 41 to execute high cooling ability.

When the operation time Tc of the compressor 41 is less than the reference time Ts (218), the controller 170 may determine that the external temperature is in the appropriate state and proceed to operation 210 to operate the compressor 41 at the low speed.

In this way, when the current power consumption Wc of the compressor 41 is less than the reference power Ws and the operation time Tc of the compressor 41 is less than the reference time Ts, the controller 170 may determine that the refrigerator 1 is in a proper load state for the cooling ability meets both the internal temperature and the external temperature. The controller 170 may thus operate the compressor 41 at low speed, thereby increase energy efficiency and reducing noise and vibrations.

Next, a method of changing the operation speed of the compressor 41 by estimating the internal temperature of the storage chamber 20 based on the current power consumption Wc of the compressor 41 will be described in more detail with reference to FIG. 4.

Figure 4:
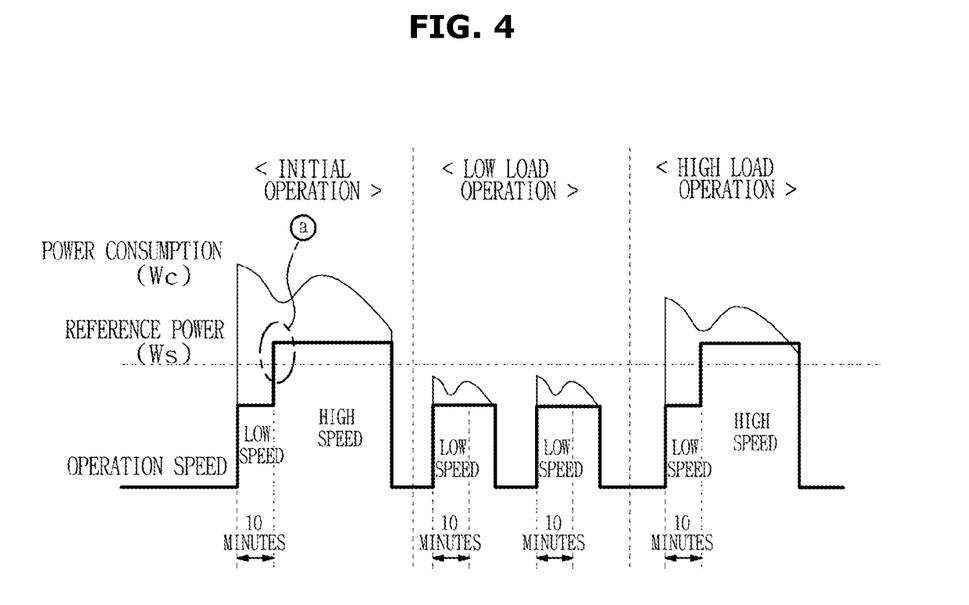
FIG. 4 is a graph under a first control condition for changing compressor speed in a refrigerator according to an embodiment.

FIG. 4 is a graph under a first control condition for changing compressor speed in a refrigerator according to an embodiment.

Referring to FIG. 4, the controller 170 may estimate the internal temperature by calculating the current power consumption of the compressor 41 based on information generated while the compressor 41 is operating at the low speed, e.g., the voltage applied to the winding of the motor 411 in the compressor 41 and the current flowing in the winding of the motor 411, and may control the operation speed of the compressor 41.

More particularly, the controller 170 may estimate the internal temperature of the storage chamber 20 by comparing the power consumption Wc with the reference power Ws.

First, when the power consumption Wc is higher than the reference power Ws, the controller 170 may determine that the storage chamber 20 is in a high load state where the internal temperature is high, and require a high cooling ability to prevent the food stored in the refrigerator 1 from going bad. To execute the high cooling ability, the controller 170 may increase the operation speed of the compressor 41 to control the internal temperature to be lowered, thereby maintaining normal cool air in the storage chamber 20 (refer to the high load operation of FIG. 4).

Since the load of the refrigerator 1 varies depending on the number of opening and closing times of a door 30, the external temperature, the food storage amount, and the temperature of the food, the controller 170 may be able to change the operation speed of the compressor 41 to maintain the normal cool air.

When the power consumption Wc is less than the reference power Ws, the controller 170 may determine that the storage chamber 20 is in a low load state where the internal temperature is low, and require lowering of the cooling ability. To lower the cooling ability, the controller 170 may reduce the operation speed of the compressor 41 to control the internal temperature to be maintained to maintain normal cool air in the storage chamber 20 (refer to the low load operation of FIG. 4).

Referring to FIG. 4, initial operation is represented by operation speed of the compressor 41 when the refrigerator 1 is started first. When the power consumption Wc is equal to or higher than the reference power Ws 10 minutes after the low speed operation, the compressor 41 may be driven to be switched into the high speed operation mode (refer to ⓐ of FIG. 4).

The controller 170 may change the operation speed of the compressor 41 according to the internal temperature by setting the reference power Ws for each step of the operation speed of the compressor 41. For example, the reference power Ws may be set to several steps Ws1, Ws2, Ws3, . . . , and the operation speed of the compressor 41 may be controlled to vary according to comparison between the power consumption Wc and the reference power Ws1, Ws2, Ws3, or the like.

In addition, a method of changing the operation speed of the compressor 41 by estimating the external temperature based on continuous operation time of the compressor 41 will be described in more detail with reference to FIG. 5.

Figure 5:
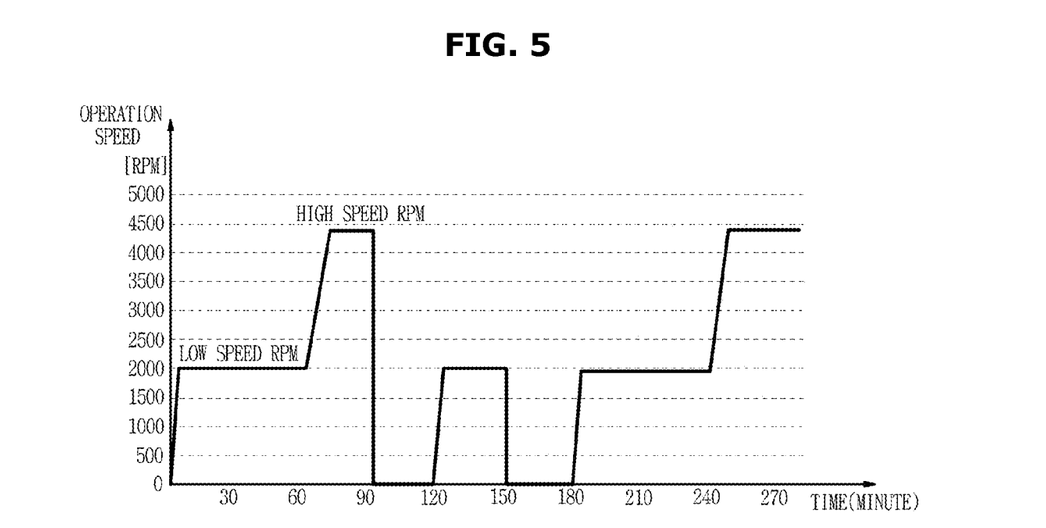
FIG. 5 is a graph under a second control condition for changing compressor speed in a refrigerator according to an embodiment.

FIG. 5 is a graph under a second control condition for changing the compressor speed in a refrigerator according to an embodiment.

Referring to FIG. 5, the controller 170 may control the operation speed of the compressor 41 by estimating an external temperature by accumulating information generated while the compressor 41 is operating at low speed, e.g., time during which the compressor 41 is operating.

Next, a start and operation algorithm of the BLDC compressor 41 used in the low-capacity/low-cost refrigerator 1 of the present disclosure will be described.

The thickness, size, and weight of the rotor or stator of the motor 411 may be minimized in order to reduce the cost of the internal motor 411 of the BLDC compressor 41 applied to the refrigerator 1 of the present disclosure. In this case, centrifugal force and inertia of the motor 411 are reduced, making it difficult to detect the position at the initial start and leading to start failure. In addition, when instantaneous power failure occurs during the operation of the compressor 41, there may be a differential pressure according to the refrigerant cycle of the refrigerator 1. At this time, when the BLDC compressor 41 is started, it may end up in start failure and making noise.

Accordingly, the inverter controller 100 may have the following start algorithm to increase the magnitude of the start current relative to the same voltage by applying a voltage to a region where a back electromotive force is small at the initial start of the compressor 41.

The voltage equation of the motor 411 may be expressed in the following equation (1):

$$V = IR + L \times di/dt + e \quad (1).$$

where, V is the voltage of the motor 411, I is the current flowing in the motor 411, R is a winding resistance of the motor 411, L is a winding inductance of the motor 411, di/dt is a current slope per hour, and e is the back electromotive force generated as the motor 411 rotates.

L×di/dt is ignorable at the initial start of the compressor 41. Therefore, I may be expressed by (V−e)/R, in which case since V and R are constant, when the voltage is applied in the region where e is small, a relatively large current may flow, so that the disadvantage of the initial start may be compensated.

Also, as the motor 411 shrinks, the BLDC compressor 41 may generate ripples in the low speed operation region.

To prevent the ripples, a speed control execution cycle may be set to a switching frequency cycle that is used for controlling the BLDC compressor 41. In this case a speed error may be obtained in a short time to change and apply the voltage, enabling relatively high accuracy in speed control and accordingly suppressing generation of the ripples. This will be described with reference to FIGS. 6 and 7.

Figure 6:
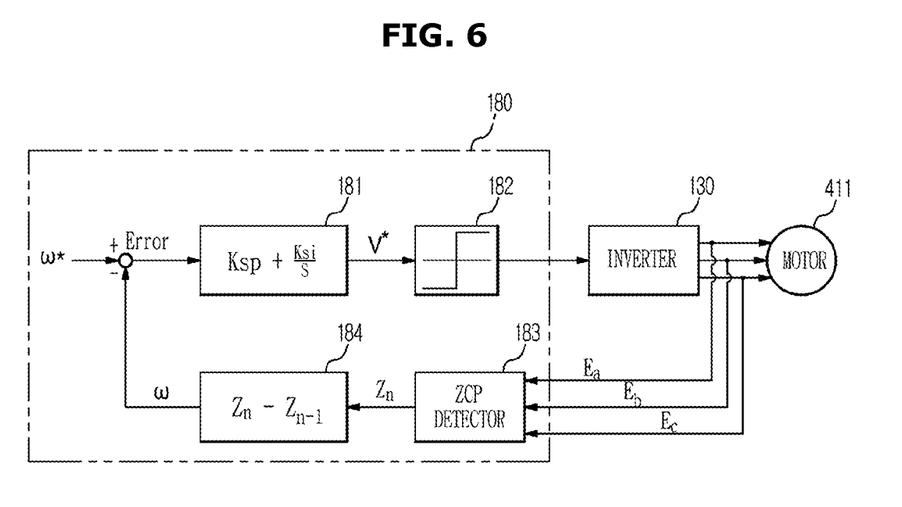
FIG. 6 is a block diagram illustrating a speed controller for a compressor according to an embodiment.
Figure 7:
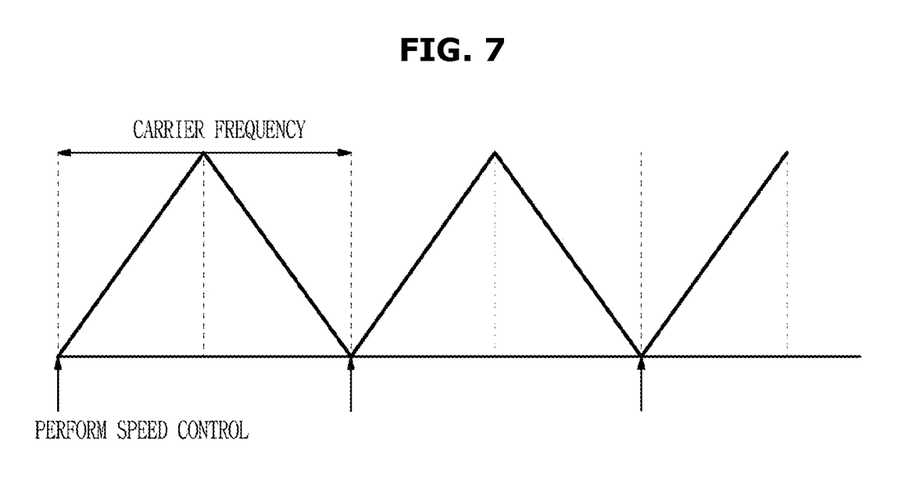
FIG. 7 is a view illustrating a speed control execution cycle of a compressor according to an embodiment.

FIG. 6 is a block diagram illustrating a speed controller of a compressor according to an embodiment, and FIG. 7 is a view illustrating a speed control execution cycle of the compressor according to an embodiment.

Referring to FIG. 6, the speed controller 180 may use a PI controller 181 to control voltage output (duty) value V* according to the control target speed based on an input value for an error between a command speed $\omega^*$ and a current speed $\omega$. The voltage output value V* may be finally output through a filter 182 as a value within a limited range.

The inverter 130 may operate the switching elements Q5 to Q10 and IGBT based on the output voltage to drive the motor 411, and detect a zero crossing point (ZCP) with a ZCP detector 183 through neutral point voltages Ea, Eb, and Ec of the respective phases to estimate the current speed $\omega$.

Accordingly, the inverter controller 100 may calculate a power consumption value, and determine operation speed based on the calculated power value. The operation speed may be the command speed $\omega^*$.

The neutral point voltages Ea, Eb, and Ec of the respective phases (U phase, V phase, W phase) may be detected during the operation of the motor 411, in which case a point where the neutral point voltage becomes Vdc/2 may be determined as a ZCP, and the current speed $\omega$ may be estimated based on the time taken for detection between the ZCP and the next ZCPZCP.

The PI controller 181 may be a controller that calculates an error between an output value and a reference value and calculates a control value necessary for control based on the error value, and have a structure in which a proportional (P) controller and an integration (I) controller operate in parallel. The PI controller 181 of the speed controller 180 may receive the error between the target speed and the current speed and output an operation voltage for the IGBT.

As illustrated in FIG. 7, when an execution cycle of the speed controller 180 is synchronized with a switching frequency cycle (e.g., 1125 μsec of a carrier frequency 8 KHz), the voltage may be changed for the speed error and applied in short time, thereby enabling relatively accurate speed control.

In addition, the inverter controller 100 may perform the following control to perform the speed control.

When a PWM duty is less than 100%, the speed may be controlled by fixing a lead angle but changing the PWM duty.

Then, when the load increases or the high speed region is reached, the controller 170 may fix the PWM duty to 100% and control the lead angle by 14° to 30° to change the speed. This will be described with reference to FIG. 8.

Figure 8:
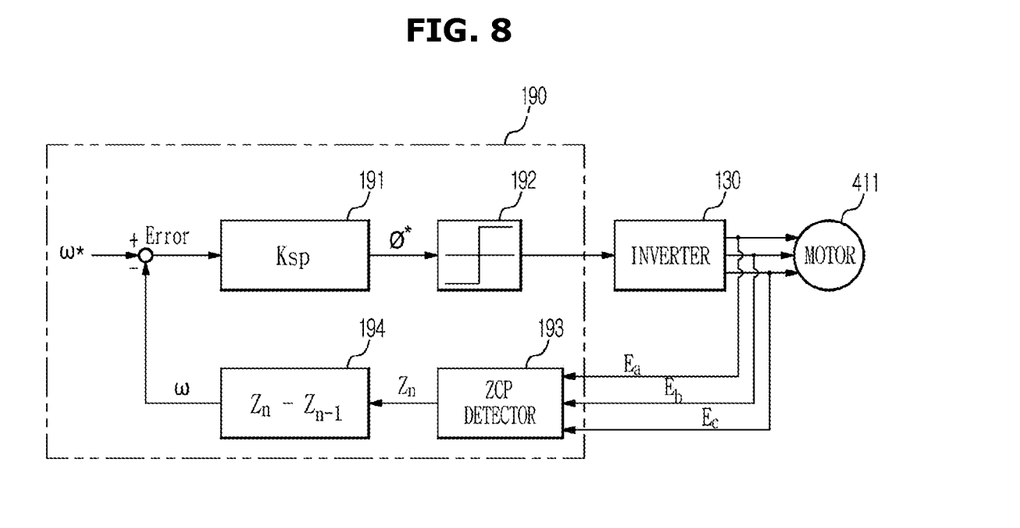
FIG. 8 is a block diagram illustrating a lead angle controller of a compressor according to an embodiment.

FIG. 8 is a block diagram illustrating a lead angle controller of a compressor according to an embodiment.

Referring to FIG. 8, the lead angle controller 190 may operate after the duty becomes 100%, and control the voltage output (duty) value through the speed controller 180 when the duty is less than 100%. When the lead angle controller 190 is operating, the duty is fixed at 100%, and the lead angle controller 190 may use the PI controller 191 to output a lead angle value Ø* according to a control target speed based on the input value for the speed error between the command speed $\omega^*$ and the current speed $\omega$. The output lead angle value may be controlled to be a value of 14° to 30° through the filter 192.

The inverter 130 may operate the switching elements Q5 to Q10 and IGBT based on the output voltage to operate the motor 411, and detect ZCPs with the ZCP detector 183 through neutral point voltages Ea, Eb, and Ec of the respective phases to estimate the current speed $\omega$.

Accordingly, the inverter controller 100 may calculate a power consumption value, and determine operation speed based on the calculated power value. The operation speed may be the command speed ω*.

The neutral point voltages Ea, Eb, and Ec of the respective phases (U phase, V phase, W phase) may be detected during the operation of the motor 411 and a point where the neutral point voltage becomes Vdc/2 may be determined as a ZCP, and the current speed ω may be estimated based on time taken for detection between the ZCP and the next ZCP.

The PI controller 191 may be a controller that calculates an error between an output value and a reference value, and calculates a control value necessary for control based on the error value, and have a structure in which a proportional (P) controller and an integration (I) controller operate in parallel. The PI controller 191 of the lead angle controller 190 may receive an error between target speed and the current speed to output the lead angle value.

In addition, the inverter controller 100 may require a large amount of current when operating the BLDC compressor 411 in an overload region. A freewheeling current may be generated by an intelligent power module (IPM) switching of the inverter controller 100 when the current in the winding of the motor 411 increases. The freewheeling current may cause wrong ZCP detection and abnormal operation and stopping of the BLDC compressor 411.

In order to prevent the wrong ZCP detection, the inverter controller 100 of the present disclosure may check a freewheeling section before the ZCP detection.

In this way, by checking the freewheeling section before the ZCP detection, the BLDC compressor 41 may operate normally even in the overload region. A method of checking the freewheeling section will be described with reference to FIG. 9.

Figure 9:
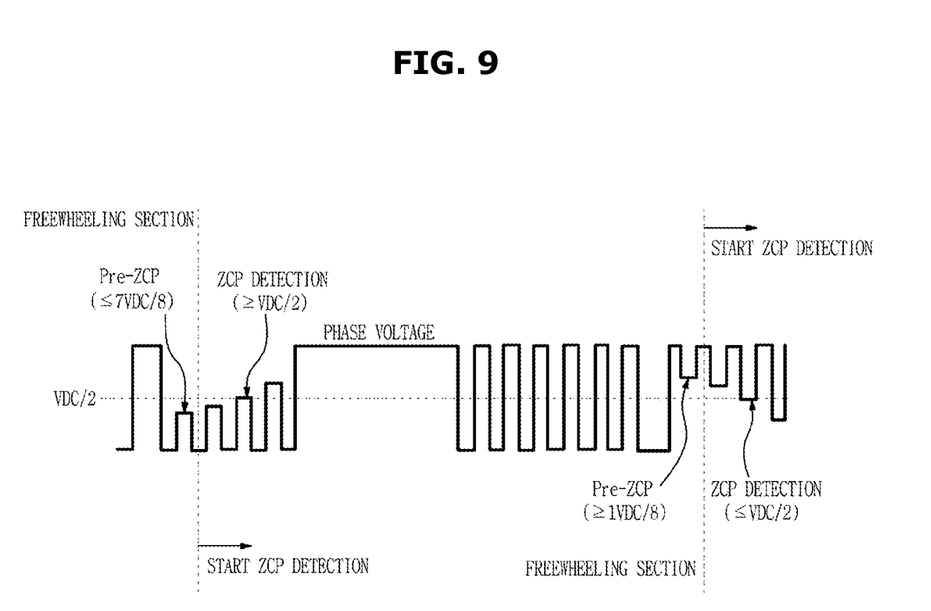
FIG. 9 is a view explaining a method of checking a freewheeling section of a compressor according to an embodiment.

FIG. 9 is a view explaining a method of checking a freewheeling section of a compressor according to an embodiment.

Referring to FIG. 9, when the ZCP detection is set from Low to High, the inverter controller 100 may be set to less than ⅞ of the DC link voltage. When the ZCP detection is set from High to Low, the inverter controller 100 may be set to more than ⅛ of the DC link voltage.

As described above, it is possible to compensate for start failure and noise of the compressor 41 through the specialized algorithm of the inverter controller 100.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a housing forming an external appearance of the refrigerator, and including a storage chamber;
a thermostat configured to operate according to an internal temperature of the storage chamber;
a compressor comprising a motor and configured to be operated according to operation of the thermostat;
an inverter controller comprising a plurality of switching elements and configured to control an operation speed of the compressor by operating the switching elements to operate the motor, based on operation information of the compressor; and
a speed controller configured to transmit an output voltage to the inverter controller and control a duty ratio of the output voltage,
wherein the inverter controller is configured to calculate power consumption of the compressor using a voltage applied to a winding of the motor in the compressor and a current flowing in the winding of the motor, and control the operation speed of the compressor based on the calculated power consumption of the compressor,
wherein the inverter controller is configured to operate the switching elements based on the duty ratio, so that the switching elements operate at a switching frequency period corresponding to the duty ratio, and
wherein the speed controller is configured to execute a speed control at an execution period, which is the same as the switching frequency period, so that the speed control and operation of the switching elements are synchronized.

2. The refrigerator according to claim 1, wherein the inverter controller is configured to change the operation speed of the compressor by estimating the internal temperature based on the calculated power consumption.

3. The refrigerator according to claim 2, wherein the inverter controller is configured to compare the power consumption with a reference power, determine that the internal temperature is high when the power consumption is equal to or higher than the reference power and increase the operation speed of the compressor.

4. The refrigerator according to claim 3, wherein the inverter controller is configured to set the reference power for different operation speeds of the compressor and change the operation speed of the compressor stepwise according to the internal temperature.

5. The refrigerator according to claim 2, wherein the inverter controller is configured to compare the power consumption with a reference power, determine to be in a load condition where the internal temperature is appropriate when the power consumption is less than or equal to the reference power, and operate the compressor at a specified speed that is less than a maximum speed.

6. The refrigerator according to claim 1, wherein the inverter controller is configured to change the operation speed of the compressor by estimating an external temperature based on the operation speed or an operation time of the compressor.

7. The refrigerator according to claim 6, wherein the inverter controller is configured to compare the operation time of the compressor with a reference time, determine that the external temperature is high when the operation time is equal to or higher than the reference time and increase the operation speed of the compressor.

8. The refrigerator according to claim 6, wherein the inverter controller is configured to compare the operation time of the compressor with reference time, determine to be in a load condition where the external temperature is appropriate when the operation time is less than or equal to the reference time, and operate the compressor at a specified speed that is less than a maximum speed.

9. The refrigerator according to claim 2, wherein the thermostat is configured to be in a conducting state when the internal temperature increases beyond a set point as the internal temperature increases and apply power to the inverter controller.

10. The refrigerator according to claim 9, wherein the inverter controller is configured to operate a brushless direct current (BLDC) motor in the compressor when a circuit is in a conducting state by the thermostat.

11. The refrigerator according to claim 1, further comprising:
a filter configured to block switching noise generated in controlling the compressor.

12. A refrigerator comprising:
a brushless direct current (BLDC) compressor comprising a motor;
a thermostat configured to transmit an electrical signal according to an internal temperature of a storage chamber;
an inverter controller comprising a plurality of switching elements and configured to operate the BLDC compressor at a specified speed according to the electrical signal transmitted from the thermostat, wherein the specified speed is less than a maximum speed; and
a speed controller configured to transmit an output voltage to the inverter controller and control a duty ratio of the output voltage,
wherein the inverter controller is configured to calculate power consumption of the BLDC compressor using a voltage applied to a winding of the motor in the BLDC compressor and a current flowing in the winding of the motor during operation of the BLDC compressor at the specified speed, and control an operation speed of the BLDC compressor by estimating the internal temperature based on the calculated power consumption,
wherein the inverter controller is configured to control the operation speed by operating the switching elements to operate the motor,
wherein the inverter controller is configured to operate the switching elements based on the duty ratio, so that the switching elements operate at a switching frequency period corresponding to the duty ratio, and
wherein the speed controller is configured to execute a speed control at an execution period, which is the same as the switching frequency period, so that the speed control and operation of the switching elements are synchronized.

13. The refrigerator according to claim 12, wherein the inverter controller is configured to control the operation speed of the BLDC compressor by estimating an external temperature using the operation speed or an operation time of the BLDC compressor.

14. The refrigerator according to claim 13, wherein the inverter controller is configured to set a reference power for different operation speeds of the BLDC compressor and change the operation speed of the BLDC compressor stepwise according to the internal temperature.

15. A method of controlling a refrigerator including a housing having a storage chamber formed therein, a thermostat configured to operate according to an internal temperature of the storage chamber, a compressor comprising a motor and configured to be operated according to operation of the thermostat, and an inverter controller comprising a plurality of switching elements, the method comprising:
calculating power consumption of the compressor by detecting a voltage applied to a winding of the motor in the compressor and a current flowing in the winding of the motor;
comparing the calculated power consumption with reference power, and increasing an operation speed of the compressor when the power consumption is equal to or higher than the reference power;
operating the compressor at a specified speed that is less than a maximum speed when the power consumption is less than the reference power; and
performing speed control according to an output voltage, to control the switching elements to operate at a switching frequency period corresponding to a duty ratio of the output voltage so as to operate the motor, thereby changing the operation speed of the compressor,
wherein the speed control is executed at an execution period, which is the same as the switching frequency period, so that the speed control and operation of the switching elements are synchronized.

16. The method according to claim 15, further comprising:
setting the reference power for different operation speeds of the compressor and increasing the operation speed of the compressor stepwise according to the internal temperature.

17. The method according to claim 15, further comprising:
counting an operation time of the compressor and comparing the operation time with a reference time;
increasing the operation speed of the compressor when the operation time is equal to or higher than the reference time; and
operating the compressor at the specified speed when the operation time is less than the reference time.

18. The method according to claim 15, wherein the compressor comprises a brushless direct current (BLDC) compressor.

* * * * *